United States Patent [19]
DeBiagio

[11] Patent Number: 5,161,589
[45] Date of Patent: Nov. 10, 1992

[54] COPING AND MITERING APPARATUS

[76] Inventor: Angelo DiBiagio, 3214 Division St., Easton, Pa. 18042

[21] Appl. No.: 834,858

[22] Filed: Feb. 13, 1992

[51] Int. Cl.$^5$ .............................. B27C 1/00; B27C 5/00
[52] U.S. Cl. .............................. 144/134 R; 144/117 B; 144/131; 144/216; 144/137; 144/359
[58] Field of Search ................ 144/2 R, 49, 114 R, 144/117 R, 117 B, 137, 134 R, 131, 216, 359

[56] References Cited

U.S. PATENT DOCUMENTS

| | | | |
|---|---|---|---|
| 999,014 | 7/1911 | DeLaney | 144/134 R |
| 1,801,722 | 4/1931 | Clausing | 144/134 R |
| 4,842,029 | 6/1989 | DeAbreu | 144/134 R |

Primary Examiner—W. Donald Bray
Attorney, Agent, or Firm—John Lezdey

[57] ABSTRACT

The invention relates to an apparatus with replaceable cutting means for providing a variety of coping or mitering processes on a workpiece. The apparatus has support which is used in combination with a drive motor to support a rotary cutter and to permit their change for different cuts. Guide means are provided to guide and hold the workpiece for engagement with the cutter.

7 Claims, 3 Drawing Sheets

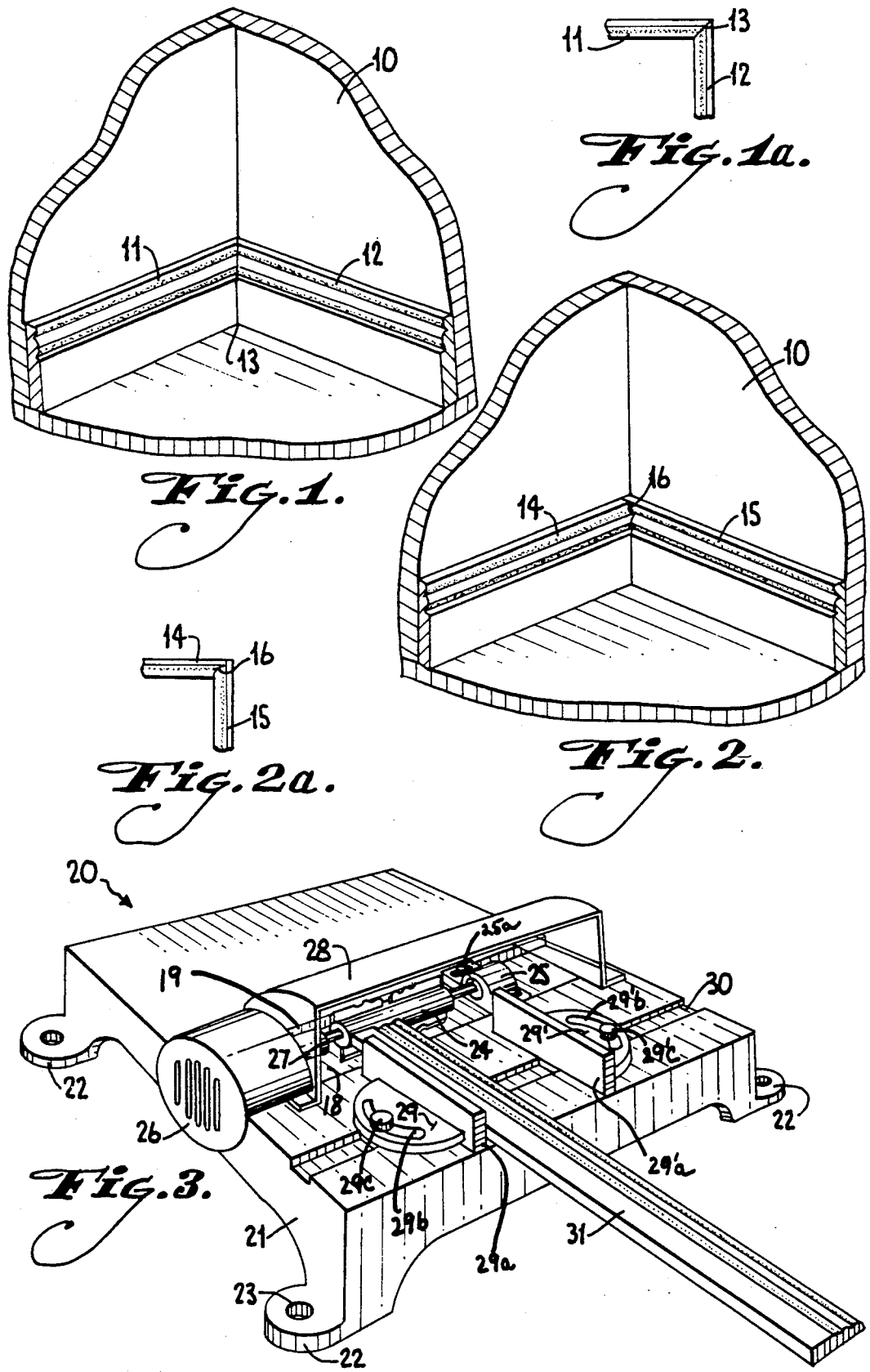

COPING AND MITERING APPARATUS

FIELD OF THE INVENTION

This invention relates to an improvement in power tools for use in woodworking. More particularly, the invention provides an apparatus for coping and mitering wooden moldings, corners, wall board, and the like.

BACKGROUND OF THE INVENTION

Mitering devices have been employed for cutting wood and molding for use as joints and base boards. However, the mitering devices are primarily used to make straight cuts. To provide the baseboard with rounded interlocking corners generally requires high skill with the mitering apparatus or the use of a coping saw. However, a coping saw also requires skill in use and time for manual cutting to avoid chipping.

There are many devices which contain guides that are used in combination with cutters for woodworking. U.S. Pat. No. 1,711,342 to Dishman discloses a molding cutting apparatus having rotating blades. The apparatus provides a face design.

U.S. Pat. No. 2,780,255 to Leonard discloses guides which are mounted on a bed to guide stock to a cutter.

U.S. Pat. No. 367,674 to Shimer discloses a cutting device mounted on a table with a movable guide and a cutter for planing flat surfaces.

U.S. Pat. No. 4,664,165 to Pollak et al discloses a power tool with a rotary blade wheel having vanes skewed at the same angle with respect to the axis of rotation to provide an air flow parallel to the axis of rotation.

SUMMARY OF THE INVENTION

The present invention provides an apparatus for performing a variety of coping or mitering processes on a workpiece. The apparatus has a housing or table with a slot extending generally traversely of the housing. An adjustable guide means is rotatably and movably mounted within the slot for supporting and guiding the workpiece. The apparatus has a replaceable rotary cutter which cuttingly engages the workpiece. The cutter can comprise a cutter capable of performing a coping operation and/or a cutter which performs a mitering operation. The cutters are replaceable with other cutters which contain cutting edges that creates a design and/or forms a joint end. An adjustable support means supports one end of the rotary cutter. Adjustment of the support means allows removal and replacement of the cutter. A drive motor supports the other end of the rotary cutter and rotatably drives the cutter.

It is therefore an object of the invention to provide an apparatus for coping or mitering a workpiece.

It is another object of the invention to rapidly and accurately form corners or joints for molding.

It is a further object of the invention to provide a coping and mitering apparatus that is simple and economic to manufacture, of rugged and durable mature and well adapted for its intended use.

It is a still further object of the invention to rapidly miter and/or chamfer a molding.

Other objects and a fuller understanding of the invention will be had by referring to the following description and claims of a preferred embodiment, taken in conjunction with the accompanying drawings, wherein like references characters refer to similar parts throughout the several views.

BRIEF DESCRIPTION OF THE DRAWINGS

FIG. 1 illustrates a prior art 45° corner miter of a molding;

FIG. 1a is a plan view of the molding of FIG. 1;

FIG. 2 illustrates a molding corner formed with the apparatus of the present invention;

FIG. 2a is a plan view of the molding of FIG. 2;

FIG. 3 is a perspective view of the apparatus of the present invention;

DESCRIPTION OF THE PREFERRED EMBODIMENT

Figure 4:
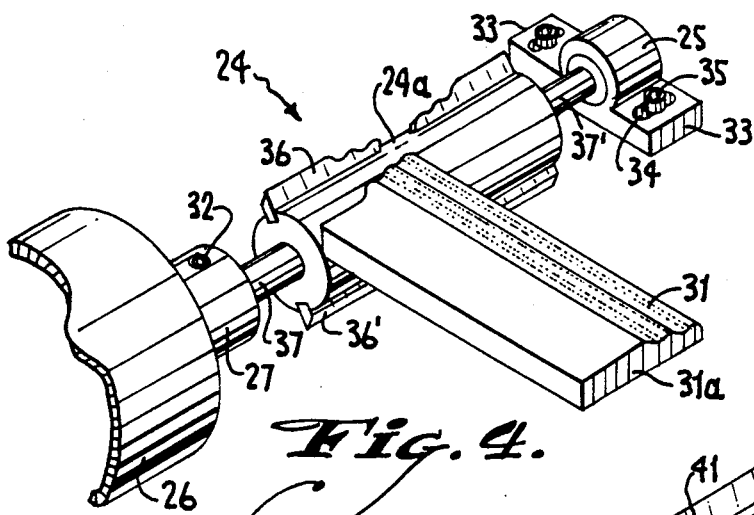
FIG. 4 is a side elevational sectional view of the cutter as supported in the apparatus.
Figure 5:
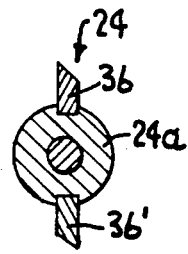
FIG. 5 is a front view of a cutter.

Although specific terms are used in the following description for the sake of clarity, these terms are intended to refer only to the particular structure of the invention selected for illustration in the drawings, and are not intended to define or limit the scope of the invention.

Referring now to the drawings in detail and particularly to that of FIGS. 1 and 1a, there will be seen a prior art method of joining a pair of moldings 11,12 at a corner of a wall surface 10. There is shown a 45° miter cut on the moldings 11,12 to form the connection 13.

In FIGS. 2 and 2a there is shown the results of a coped method for forming a corner which can be performed using a coping saw or the apparatus of the invention. The molding 14 has a coped end and molding 15 has a straight or squared end to form the corner 16.

As shown in FIG. 3, the coping and mitering apparatus 20 of the invention generally consists of a housing or table 21 supported by a plurality of legs 22 having apertures 23 so as to bolt or secure the apparatus 20 to a support surface.

The surface of the table 21 has a slot 30 extending generally traversely on the surface. Within the slot 20 are mounted a pair of guides 29, 29' having flat guiding surfaces 29a, 29'a between which a workpiece 31, such as a molding is held and guided. The guides 29, 29' move within the slot 30 and are rotational on the table surface so as to angularly direct the workpiece 31 to the cutting head 24. The guides 29,29' pivot about the screws 29c, 29'c which are in slots 29b on the base of the guides 29,29'. The guides 29,29' function by aligning their flat surfaces 29a,29'a with the cutting head 24 at a desired angle. This can be performed by loosening the screws 29c,29'c, which can be T or L screws, and pivoting the guides about the screws 29c,29'c. A workpiece 32 can be held by hand and pressed against either surface 29a, 29'a and advanced until it contacts the cutting head 24. Alternatively, the workpiece can be clamped between the guides 29,29' and guided to the cutting head 24.

The table 21 has an opening 19 in which an electric drive motor 26 is housed. Also within the opening 19 and supported by the motor 26 at one end and a journal bearing support 25 at the other end is a rotary cutting head 24. The cutting head 24 rotates clockwise within the opening 19 so as to cause the debris from the cut to go downward into the opening 19 and away from the cut.

Beneath the opening 19 is a slidable removable tray 18 on the bottom of the table 21 that is on runners (not shown) for removal of debris.

Surrounding the cutting head 24 is a removable shroud 28 which aids in deflecting the chips and debris from the cutting action away from an operator of the apparatus and into the opening 19.

As shown in FIG. 4, cutting head 24 is typically provided with two or more spaced cutting blades or vanes 36,36' on a generally cylindrical blade wheel 24a. The blade wheel 24a is mounted within the opening 19 such that the cutting blades 36,36' are exposed through the opening 19 and project above the upper surface portion of the table 21. A workpiece 31 is passed over this surface and is brought into contact with the cutting blades 36,36' on the blade wheel 24a. A layer of material is removed from the contacting surface of the workpiece 31 in a continuous manner by the blades 36,36'.

The cutting head 24 is provided with an arm 37 having a slot 37a that is held and supported by a rotor body 37 mounted on the shaft of the drive motor 26. The rotor body 27 by means of a screw 32 holds the cutting head 24 in place, whereby the cutting head 24 is directly driven and rotates at the same speed of the motor shaft.

The arm 37' at the other end of the cutting head 24 is supported in journal bearing support 25. The support 25 has a race 25a rotatably journaling the arm 37'. The support 25 is provided with a pair of arms 33 at its base each with a slot 34 in which a fastening bolt 35 is located. The support 25 can be moved back and forth so as to release arm 37' and permit removal of the cutting head 24.

Figure 6:
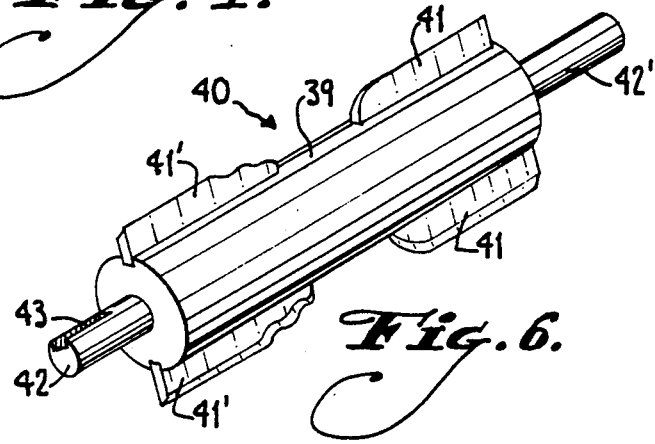
FIG. 6 is a perspective view of a cutter with coping and mitering blades.

FIG. 6 illustrates a typical cutting head 40 which can be used in the present apparatus. The cutting head 40 has a generally cylindrical blade wheel 39. Cutting head 40 is provided with a pair of spaced coping blades 41 on one side and spaced mitering blades 41 on the other side. The arm 42 is inserted into a mating slot in the rotor body 27. The screw 32 is tighten into the slot 43 on the arm 42 to fix the cutting head 40. The other arm 42' is inserted into the journal support 25.

Figure 7A:
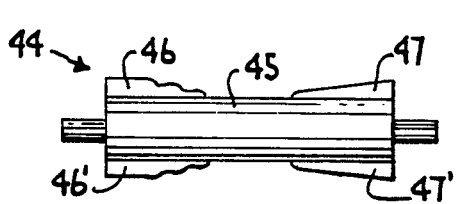
FIGS. 7a-d are side views of different cutters.

FIG. 7a illustrates a cutting head 44 having a blade wheel 45 with coping blades 46,46' on one side of the blade wheel 45 and angular mitering blades 47,47' on the other side. The angular blades 47,47' permit the chamfering of the workpiece without adjustment of the guides.

Figure 7B:
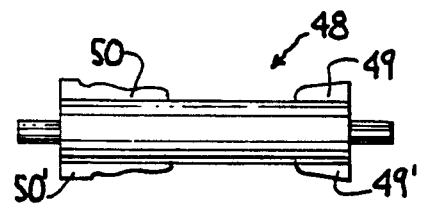

FIG. 7b illustrates a cutting head 48 which is provided with coping blades 50,50' and chipping blades 49,49' which can be used to make smaller end chamfers.

Figure 7C:
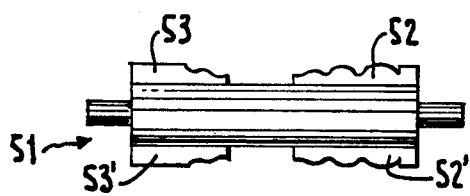

FIG. 7c shows a cutting head 51 with one type of coping blade 53,53' are on one side and another type of coping blades 52,52' are on the other side. Cutting head 51 permits forming decorative variations without changing cutting blades.

Figure 7D:
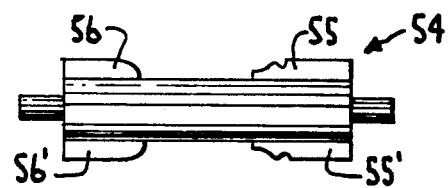

FIG. 7d shows a cutting head 54 with different forms of mitering blades 56,56' on the left side and coping blades 55,55' on the right side.

Figures 8, 9:
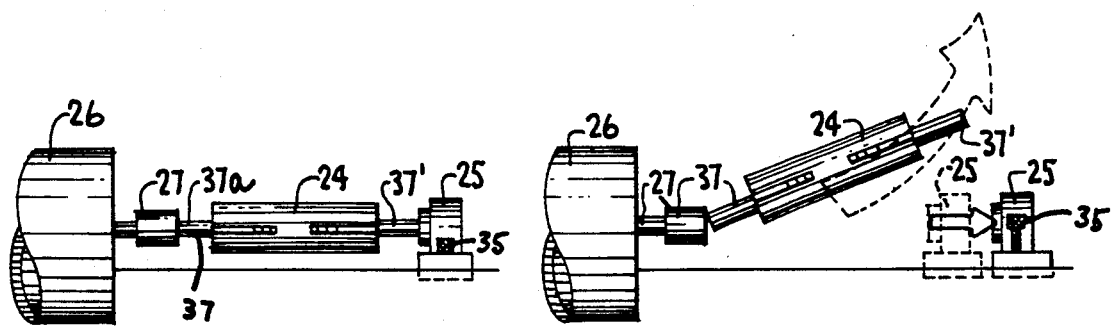
FIG. 8 illustrates a cutter in position for use.
FIG. 9 illustrates the removal of the cutter of FIG. 8.

FIGS. 8 and 9 illustrate the simplicity of changing cutting heads on the apparatus of the invention. The apparatus in FIG. 8 is shown with the cutting head 24 positioned with one end 37 within the slot 37a in rotor body 27. To remove the cutting head 24 and exchange it with another cutting head, the screws 35 are loosened and the support 25 is slid to the right the distance of the slots 34 whereby arm 37' becomes free and clear of the support 25. The screw 32 on the rotor body 27 is also loosened so that the arm 37 could be withdrawn.

Figure 10:
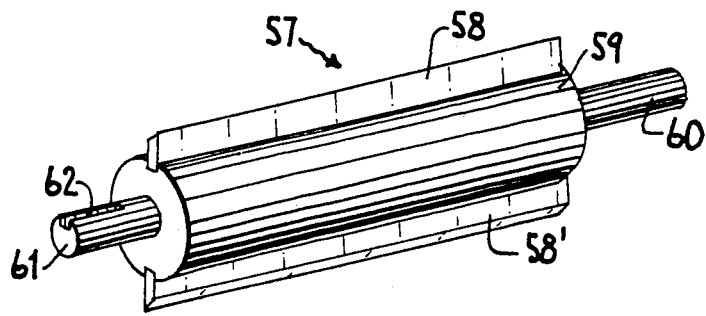
FIG. 10 shows a cutter for mitering.
Figure 11:
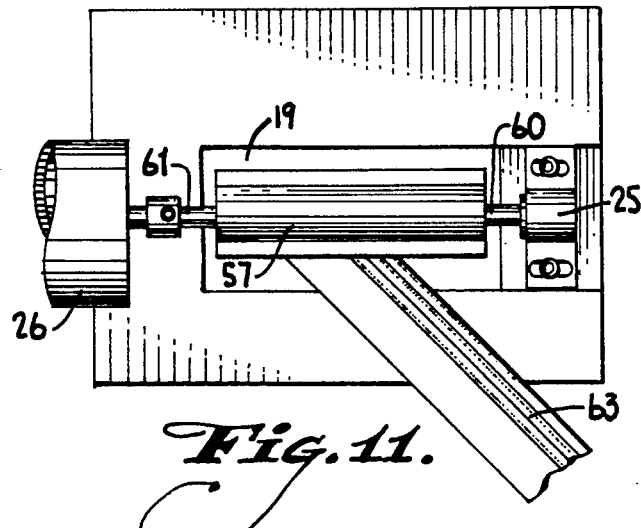
FIG. 11 shows the cutter of FIG. 10 in a mitering process.

FIG. 10 shows a typical mitering cutting head 57 wherein a pair of spaced cutting blades 58,58' completely traverse the cylindrical cutter body 59. As seen in FIG. 11 the arm 61 with slot 62 is inserted into the rotor body and the arm 60 is inserted into the support 25 as shown in FIGS. 8 and 9. A workpiece 63 can then be mitered as required with the chips falling into the opening 19.

Although the invention has been described with a certain degree of particularity, it is understood that the present disclosure has been made only by way of example and that numerous changes in the details of construction and the combination and arrangement of parts may be resorted to without departing from the spirit and scope of the invention.

What is claimed is:

1. An apparatus with replaceable cutting means for performing a variety of coping or mitering processes on a workpiece comprising;
   a table having a slot extending generally traversely of said table,
   adjustable guide means rotatably and movably mounted within said slot for supporting said workpiece,
   a replaceable rotary cutter cuttingly engageable with said workpiece,
   a slidably adjustable support means supporting one end of said rotary cutter, and
   a drive motor supporting said cutter at the other end and rotatably driving said cutter,
   whereby said cutter is replaceable by adjusting the support means to provide a different cutter to perform a mitering process or a coping process.

2. The process of claim 1 wherein said rotary cutter performs a mitering process.

3. The apparatus of claim 1 wherein said rotary cutter performs a coping process.

4. The apparatus of claim 1 wherein said guide means comprises a pair of guide members which holds and guides said workpiece.

5. The apparatus of claim 1 wherein said support means comprises a bearing journal.

6. The apparatus of claim 1 including a protective shroud over said rotary cutter.

7. The apparatus of claim 1 wherein said table has an opening in which said cutter is housed.

* * * * *